(12) United States Patent
Shingo et al.

(10) Patent No.: US 7,343,992 B2
(45) Date of Patent: Mar. 18, 2008

(54) HIGH VOLTAGE WIRE ROUTING STRUCTURE OF HYBRID VEHICLE

(75) Inventors: Kazuaki Shingo, Nishikamo-gun (JP); Hiroyuki Tsukashima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/801,554

(22) Filed: Mar. 17, 2004

(65) Prior Publication Data

US 2004/0200647 A1 Oct. 14, 2004

(30) Foreign Application Priority Data

Apr. 9, 2003 (JP) ............................. 2003-105172

(51) Int. Cl.
*B60K 1/00* (2006.01)
(52) U.S. Cl. .................... 180/65.1; 180/65.2; 903/907
(58) Field of Classification Search ............... 180/65.1, 180/65.2, 65.3, 65.4, 65.6, 65.7, 65.8; 439/34, 439/289; 318/432, 139, 434; 174/651, 65 R; 903/903, 905, 907, 906
See application file for complete search history.

(56) References Cited

U.S. PATENT DOCUMENTS

| | | | | |
|---|---|---|---|---|
| 3,828,880 A | * | 8/1974 | Smith ........................ | 180/65.3 |
| 4,042,056 A | * | 8/1977 | Horwinski ................. | 180/65.2 |
| 4,271,452 A | * | 6/1981 | Lee ............................ | 361/231 |
| 5,355,581 A | * | 10/1994 | Soriano ...................... | 29/857 |
| 5,495,906 A | * | 3/1996 | Furutani .................... | 180/65.2 |
| 5,669,590 A | * | 9/1997 | Przewodek ................ | 248/68.1 |
| 5,689,174 A | * | 11/1997 | Pacheco, Sr. ............. | 180/65.1 |
| 6,435,294 B1 | * | 8/2002 | Hara et al. ................. | 180/65.4 |
| 6,460,642 B1 | * | 10/2002 | Hirano ....................... | 180/65.1 |
| 6,488,107 B1 | * | 12/2002 | Ochiai et al. .............. | 180/65.2 |
| 6,627,817 B1 | * | 9/2003 | Kortenbach ............... | 174/74 R |
| 6,664,678 B2 | * | 12/2003 | Shimizu ..................... | 310/71 |
| 6,710,249 B1 | * | 3/2004 | Denton ....................... | 174/651 |
| 6,766,874 B2 | * | 7/2004 | Naito et al. ................ | 180/65.3 |
| 6,856,057 B2 | * | 2/2005 | Kobayashi et al. ........... | 310/71 |
| 6,870,336 B2 | * | 3/2005 | Murakami et al. ........... | 318/432 |

FOREIGN PATENT DOCUMENTS

| | | |
|---|---|---|
| DE | 199 53 864 A1 | 5/2000 |
| EP | 1 069 309 A2 | 1/2001 |
| EP | 1 440 834 A1 | 7/2004 |
| JP | A 63-104715 | 5/1988 |
| JP | 7-89355 A | 4/1995 |

(Continued)

OTHER PUBLICATIONS

German Office Action dated Jan. 30, 2006 with English Translation thereof.

*Primary Examiner*—Hau Phan
(74) *Attorney, Agent, or Firm*—Kenyon & Kenyon LLP

(57) ABSTRACT

According to an aspect of the invention, a hybrid vehicle comprises an engine which is mounted in an engine room and serves as a driving force, a transmission which is disposed adjacent to the engine and incorporates at least one electric motor that serves as the driving source, an inverter disposed in the engine room, and at least one high voltage wire which is routed behind the engine with respect to a vehicle longitudinal direction and connects the inverter with the electric motor incorporated in the transmission.

12 Claims, 5 Drawing Sheets

FOREIGN PATENT DOCUMENTS

| | | |
|---|---|---|
| JP | A 10-58990 | 3/1998 |
| JP | A 2000-152470 | 5/2000 |
| JP | 2000-217205 A | 8/2000 |
| JP | A 2000-236174 | 8/2000 |
| JP | 2000-255282 A | 9/2000 |
| JP | 2001-097051 A | 4/2001 |
| JP | 2001-097052 A | 4/2001 |
| JP | 2001-103706 A | 4/2001 |
| JP | 2001-138752 A | 5/2001 |
| JP | 2001-322439 A | 11/2001 |
| JP | 2001-354040 A | 12/2001 |
| JP | 2004107918 A * 9/2002 | ................ 180/65.2 |
| JP | 2002-364536 A | 12/2002 |
| JP | 2004-304902 A | 10/2004 |
| JP | 2004-304923 A | 10/2004 |
| JP | A 2005-104386 | 4/2005 |
| JP | A 2005-104387 | 4/2005 |

\* cited by examiner

HIGH VOLTAGE WIRE ROUTING STRUCTURE OF HYBRID VEHICLE

INCORPORATION BY REFERENCE

The disclosure of Japanese Patent Application No. 2003-105172 filed on Apr. 9, 2003 including the specification, drawings and abstract is incorporated herein by reference in its entirety.

BACKGROUND OF THE INVENTION

1. Field of the Invention

The invention relates to a wire routing structure of a high voltage wire which connects an inverter and an electric motor incorporated in a transmission in a hybrid vehicle.

2. Description of the Related Art

In recent years, hybrid vehicles provided with two types of driving sources, namely, engine and an electric motor, having different characteristics, have been developed and are in practical use. In this type of hybrid vehicles, driving force of the aforementioned two types of driving sources are optimally combined depending on conditions, thereby making full use of advantages of respective driving sources while compensating for disadvantages thereof. Accordingly, dynamic performance of the hybrid vehicle can be sufficiently secured, and at the same time, fuel efficiency and emission performance can be significantly improved. Japanese Patent Laid-Open No. 10-58990 discloses an example of such type of a hybrid vehicle in which a transmission is disposed at the back of an engine with respect to a vehicle longitudinal direction, and an electric motor, power input-output means, and electric motor are arranged in this order within the transmission.

It should be noted that a related art of the invention is disclosed in Japanese Patent Laid-Open No. 2000-152470, in addition to the art described above.

In the hybrid vehicle mentioned above, a battery and an inverter, and the inverter and an electric motor are connected by a high voltage wire, respectively. Direct current from the battery is converted into alternate current by the inverter to be supplied to the electric motor. At the same time, the alternate current generated by the electric motor is converted into the direct current by the inverter to charge the battery. The high voltage wire is required not to break or be disconnected even if impact is applied to the hybrid vehicle.

However, although Japanese Patent Laid-Open No. 10-58990 discloses the arrangement of respective devices such as the electric motor and the power input-output means, descriptions on a high voltage wire and routing thereof are not included. Thus, an influence on the high voltage wire caused when the impact is applied as mentioned above is not taken into account. As a result, the aforementioned requirements of the wire may not possibly be satisfied depending on a form of high voltage wire routing.

SUMMARY OF THE INVENTION

The invention is made in consideration of the aforementioned circumstances, and it is an object of the invention to provide a high voltage wire routing structure of a hybrid vehicle by which breakage or disconnection of a high voltage wire can be suppressed even if impact is applied to the hybrid vehicle.

Hereafter, means for achieving the above object and operation and effects thereof will be described. A hybrid vehicle according to one aspect of the invention comprises an engine which is mounted in an engine room and serves as a driving source, a transmission which is disposed adjacent to the engine and incorporates at least one electric motor which serves as a driving source, an inverter disposed in the engine room, and at least one high voltage wire which is routed at the back of the engine with respect to a vehicle longitudinal direction and connects the inverter with the electric motor incorporated in the transmission.

In this case, if impact is applied to the hybrid vehicle, devices, parts, and the like arranged in the surrounding of the engine are generally susceptible to deformation or displacement compared to the engine. Accordingly, for instance, when the impact is applied to the hybrid vehicle from the front, the devices, parts, and the like arranged in front of the engine are deformed or displaced to the rear, thus reducing a clearance to the engine. Similarly, for example, when the impact is applied to the hybrid vehicle from the side, the devices, parts, and the like toward one of the lateral sides of the vehicle from the engine are deformed or displaced, thus reducing the clearance to the engine.

Consequently, if a high voltage wire is routed in front of the engine with respect to the vehicle longitudinal direction, when the impact is applied to the hybrid vehicle from the front, the high voltage wire is pinched between the engine and the devices, parts, and the like arranged in front of the high voltage wire. Furthermore, if the high voltage wire is routed on one of the lateral sides from the engine, when the impact is applied to the hybrid vehicle from the side, the high voltage wire is pinched between the engine and the devices, parts, and the like arranged toward one of the lateral sides of the vehicle from the high voltage wire. Consequently, such pinching of the high voltage wire may cause breakage or disconnection of the wire.

In regard to this point, in the hybrid vehicle according to the aforementioned aspect of the invention, the engine is not susceptible to deformation or displacement even when the impact is applied to the hybrid vehicle from the front. Therefore, it is less likely that the high voltage wire is pinched between the engine and the devices, parts, and the like arranged behind the high voltage wire. Similarly, the high voltage wire is less likely to be pinched between the engine and the devices, parts, and the like arranged toward the lateral side of the vehicle from the high voltage wire. Consequently, breakage or disconnection of the high voltage wire can be suppressed even if the impact is applied to the hybrid vehicle from the front or sides.

Furthermore, a middle portion of the high voltage wire may be secured to a securing unit. As a result, movement of a portion of the high voltage wire that is secured to the securing unit and vicinity thereof is restricted, thus suppressing interference with other parts which is caused by vibration of such portion.

Furthermore, the securing unit may consist of at least one of the engine, an engine accessory fixed to the engine, the transmission, and a transmission accessory fixed to the transmission.

According to the construction of the hybrid vehicle, the engine and the transmission vibrate together. If the engine accessory is fixed to the engine, or if the transmission accessory is fixed to the transmission, these accessories vibrate together with the engine and the transmission. If the high voltage wire moves with respect to the electric motor due to such vibration, a load is applied to a connecting portion of the high voltage wire with the electric motor. Therefore, it is necessary to make the connecting portion robust so as to withstand the load. As a result, a shape of the connecting portion or the connection structure may possibly become complicate.

In this regard, if the high voltage wire is secured to at least one of the engine, the engine accessory, the transmission, and the transmission accessory, the movement of the high voltage wire in relation to the electric motor is suppressed, thereby reducing the load applied to the connecting portion of the high voltage wire with the electric motor. Consequently, the shape of the connecting portion of the high voltage wire or the connection structure can be simplified.

Furthermore, the engine accessory may be an intake pipe for introducing air to the engine, and the high voltage wire may be secured to the engine and the intake pipe. In this case, a temperature of the intake pipe which is an engine accessory is considered to be the lowest of those temperatures of the engine, other engine accessories, the transmission, and the transmission accessories. Accordingly, by securing the high voltage wire to the intake pipe, it is possible to minimize an influence of heat on the high voltage wire caused by the engine, transmission, and the like.

Moreover, the high voltage wire may include a restricted portion that is secured to the securing unit whereby the movement thereof is restricted, and a non-restricted portion that is not secured to the securing unit so that the movement thereof is not restricted. Accordingly, the restricted portion of the high voltage wire is restricted from moving by being secured to the securing portion, thus being less likely to interfere with other parts. Meanwhile, movement of the engine and the transmission normally differ from that of the inverter fixed to a vehicle body. Therefore, the high voltage wire for connecting the inverter and the electric motor requires to include a portion to absorb relative movement of the inverter in relation to the engine, transmission, and the like. In regard to this point, in a case that the non-restricted portion functions as the absorbing portion described above, when the engine and the transmission move in relation to the inverter, the non-restricted portion deforms in accordance with such movement. Then, the deformation of the non-restricted portion absorbs the relative movement mentioned above.

Furthermore, the high voltage wire may be routed such that the restricted portion thereof is positioned closer to the engine and transmission side, while the non-restricted side thereof is positioned closer to the inverter side, the inverter being fixed to a vehicle body. In this case, the engine moves in a rotational, longitudinal, or vertical direction or the like in accordance with the engine operation. In addition, the transmission vibrates in accordance with operation thereof. As a result, relative movement occurs between the engine and transmission and, the inverter which does not vibrate by itself. Therefore, due to deformation of the non-restricted portion of the high voltage wire that is positioned closer to the inverter side, the aforementioned relative movement can be absorbed.

Moreover, the restricted portion of the high voltage wire that is positioned closer to the engine and transmission side is secured to the securing unit. Thus, the restricted portion is less likely to interfere with other parts, and vibrates together with the engine and the transmission (including the electric motor). Consequently, application of a load to the electric motor caused by the relative movement of the high voltage wire in relation to the electric motor can be suppressed.

Furthermore, the high voltage wire may be secured to the securing unit at a location that is apart from an exhaust pipe of the engine. In this case, since the high voltage wire is positioned apart from the exhaust pipe, the wire is not susceptible to an influence of heat generated from the exhaust pipe.

Moreover, the exhaust pipe may be disposed toward one of the lateral sides of the vehicle from the engine. According to this arrangement, the high voltage wire routed behind the engine with respect to the vehicle longitudinal direction is positioned apart from the exhaust pipe disposed toward the lateral side of the vehicle from the engine. Consequently, the high voltage wire is not susceptible to the influence of heat from the exhaust pipe by such clearance provided between the wire and the exhaust pipe.

Furthermore, the engine may be a V-type engine which includes a pair of banks in which a plurality of cylinders are arranged in the vehicle longitudinal direction, respectively, and exhaust pipes are arranged toward a lateral side of the vehicle from the respective banks. The high voltage wire may be routed near and above the transmission. Accordingly, since the high voltage wire routed near and above the transmission is positioned apart from the exhaust pipes each of which is disposed toward the lateral side of the vehicle from the banks of the V-type engine, the wire is not susceptible to the influence of heat generated by the exhaust pipes.

Furthermore, the inverter and the electric motor are connected by a plurality of high voltage wires, and respective wires may be secured to the securing unit in a bundle. In this case, since the high voltage wires are bundled, rigidity thereof increases compared to a case in which respective high voltage wires are secured separately. As a result, the high voltage wires is less likely to vibrate, and thus interference with other parts can further be suppressed.

Moreover, a securing member secures the high voltage wire to the securing unit may be provided integrally with the securing unit. In this case, since the securing member is provided integrally with the securing unit, the number of parts can be reduced compared to a case in which the securing member is provided separately from the securing unit.

In addition, the transmission may be disposed at the back of the engine with respect to the vehicle longitudinal direction, while the inverter may be disposed near and above the engine, and the electric motor may be connected with the high voltage wire at the upper portion of the transmission. Also, an intake pipe that is provided above the engine and below the inverter and introduces air to the engine may further be provided, and the high voltage wire may be secured to the engine and the intake pipe.

According to this arrangement, the inverter, the high voltage wire, and the connecting portion between the electric motor and the high voltage wire are positioned near and above the transmission disposed at the back of the engine with respect to the vehicle longitudinal direction. As a result, the electric motor and the inverter can be connected by the high voltage wire by the shortest route or a similar short route.

BRIEF DESCRIPTION OF THE DRAWINGS

FIG. 4 is a schematic drawing showing a positional relation of the transmission, an inverter, a high voltage wire, and the like.

DETAILED DESCRIPTION OF THE PREFERRED EMBODIMENTS

Figure 1:
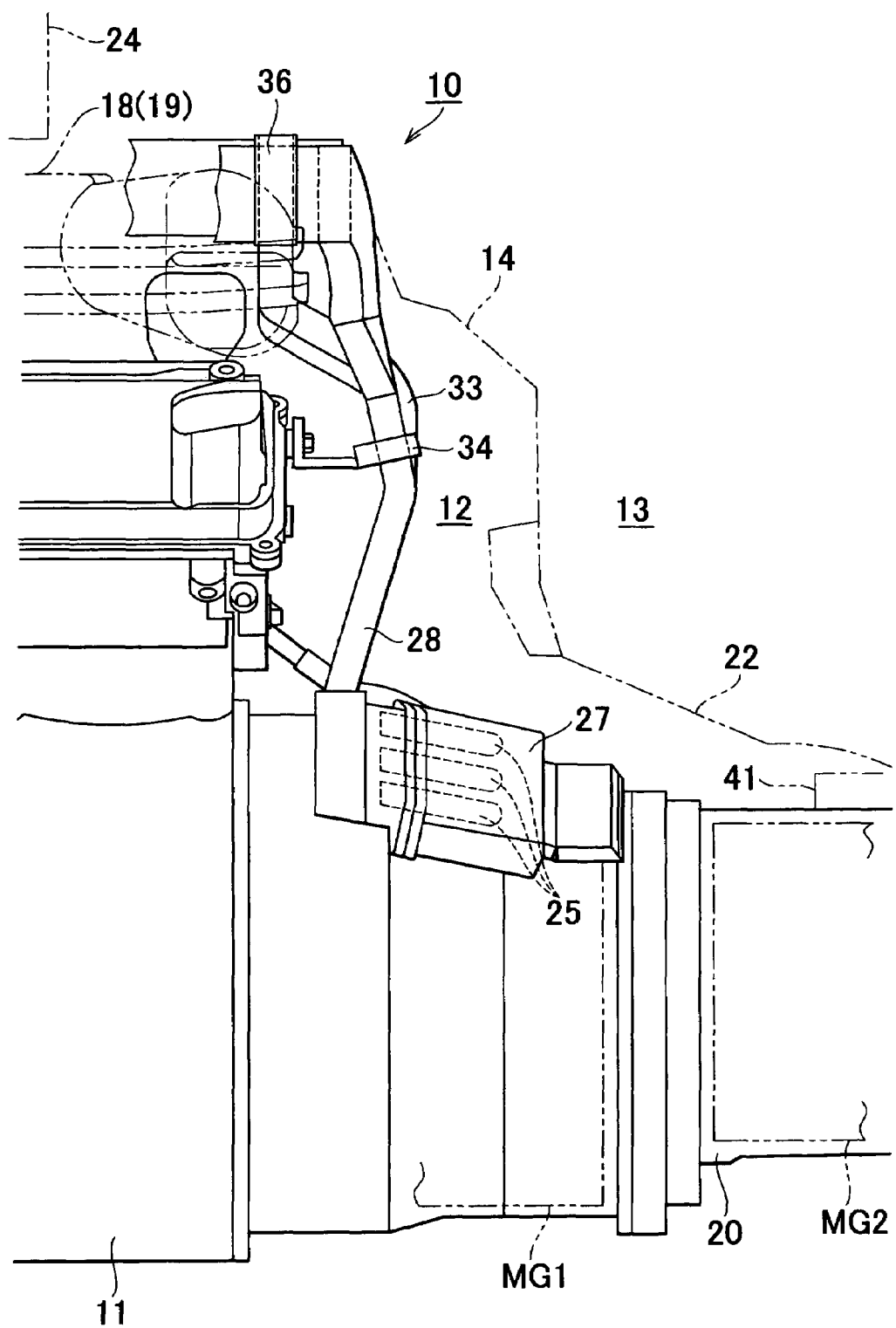
FIG. 1 is a partly sectional view of a high voltage wire routing structure according to an embodiment of the invention.

Hereafter, with reference to FIGS. 1 to 4, descriptions will be given of an embodiment in which the invention is applied to a hybrid vehicle that employs a front-engine rear-drive (FR) system in which an engine is mounted in the front portion of the vehicle to drive the rear wheels.

A hybrid vehicle 10 according to the present embodiment is provided with two types of driving sources having different characteristics, namely, an engine 11 and an electric motor, and runs by transmitting driving force that is optimally combined depending on conditions to driving wheels. It should be noted that, in FIG. 1, the left side indicates a front side of a longitudinal direction of the hybrid vehicle 10, while the right side indicates a rear side of the longitudinal direction of the hybrid vehicle 10.

The engine 11 is disposed in front of a dash panel 14 which is a partition between an engine room (also referred to as an engine compartment) 12 and a cabin 13 of the hybrid vehicle 10. The present embodiment employs, as the engine 11, a V-type engine in which a pair of banks 15 including a plurality of cylinders 16, respectively, is disposed in the form of a V-shape. The engine 11 is mounted in the engine room 12 such that the cylinders 16 of each bank 15 are lined in the vehicle longitudinal direction (refer to FIG. 2). As an engine accessory 18, an intake pipe 19 for introducing air into each cylinder 16 is fixed to the engine 11. In addition, a surge tank, various accessories (such as an alternator and a water pump) are fixed to the engine 11 as the engine accessories 18.

In the engine 11, exhaust pipes 23 (refer to FIG. 3) for guiding exhaust gas generated by operation of the engine 11 to outside of the engine are provided for respective cylinders 16. The exhaust pipes 23 extend toward the outer lateral sides of the vehicle from the corresponding bank 15. The plurality of exhaust pipes 23 provided for each bank 15 are joined together into one piece.

A transmission 20 is disposed at the back of the engine 11 with respect to the vehicle longitudinal direction in a state adjacent to the engine 11. The transmission 20 is connected to and driven by an output shaft of the engine 11. At least a part of the transmission 20 is positioned within a center floor tunnel 22 provided under the floor of the hybrid vehicle 10. Furthermore, the respective exhaust pipes 23 provided for respective banks 15 mentioned above are disposed such that a part of the respective pipes is positioned at opposing locations that sandwich the transmission 20, as shown in FIG. 3.

Two motor-generators MG1 and MG2 are incorporated within the transmission 20 as electric motors. The motor-generators MG1 and MG2 are constructed of an alternating-current synchronous motors. These motors function as generators in addition to motors, and are also capable of switching such functions depending on conditions. For example, the motor-generator MG1 mainly serves as a generator for generating electricity by power of the engine 11 during normal running of the hybrid vehicle 10. On the other hand, the motor-generator MG2 serves as a motor that generates auxiliary power for driving the driving wheels separately from the power of the engine 11. It should be noted that the transmission 20 incorporates, in addition to the motor-generators MG1 and MG2, other mechanisms such as a deceleration mechanism and a power dividing mechanism for distributing power generated by the engine 11 to the motor-generator MG1 and the driving wheels.

Figure 2:
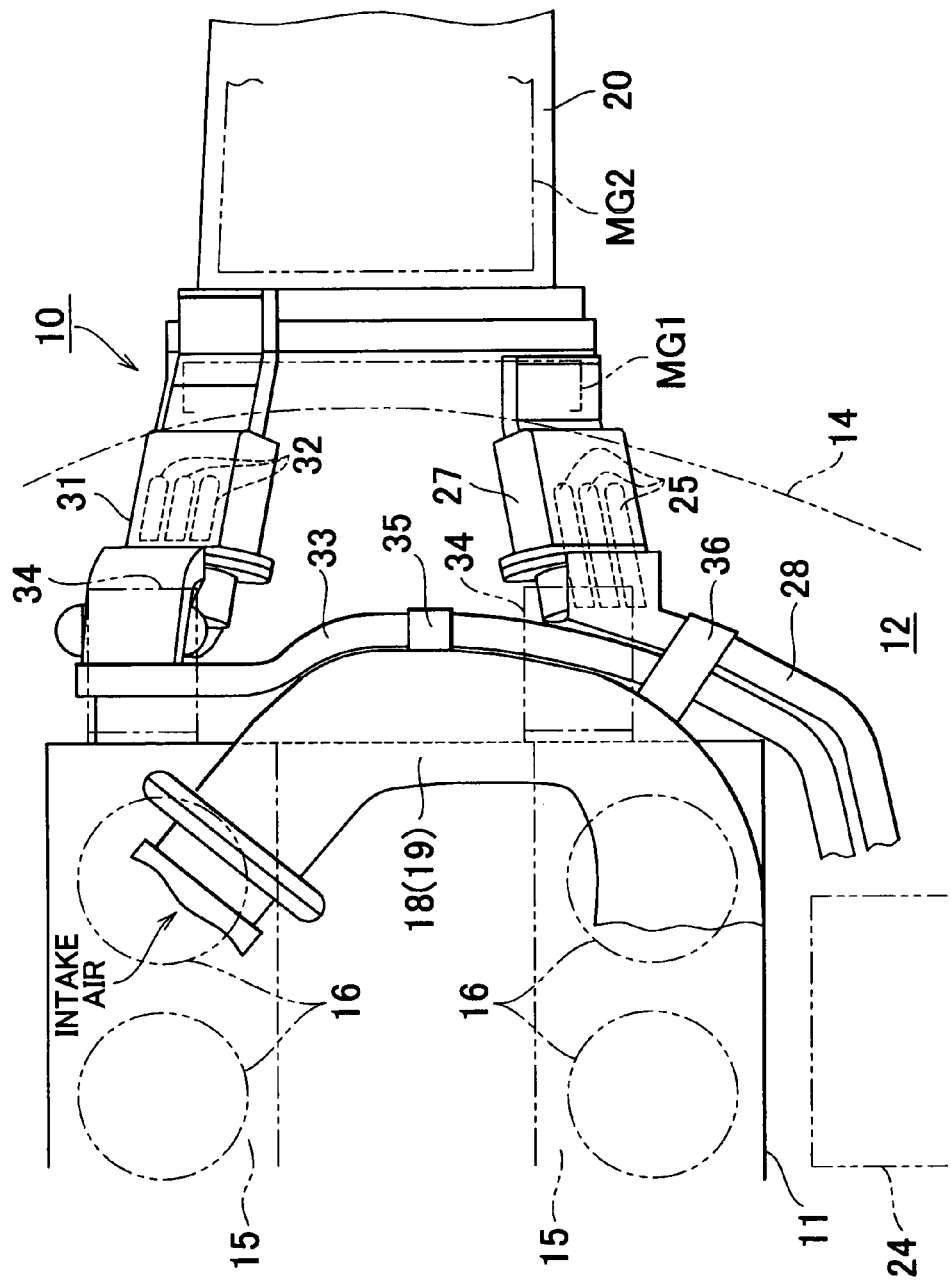
FIG. 2 is a partly plan view of the routing structure.

Meanwhile, an inverter 24 is installed near and above the engine 11 in a vehicle body 17 (refer to FIG. 4), and is connected with a battery (not shown) by a high voltage wire. Furthermore, as shown in FIGS. 1 and 2, the inverter 24 is connected with the motor-generator MG1 by a plurality of high voltage wires 25 (for instance, three wires) routed through a space between the engine 11 and the dash panel 14. Similarly, the inverter 24 is connected with the motor-generator MG2 by a plurality of high voltage wires 32 (for instance, three wires) routed through a space between the engine 11 and the dash panel 14. The inverter 24 converts direct current from the battery into alternate current to supply the motor-generators MG1 and MG2 with such current, and converts alternate current generated by the motor-generator MG1 into direct current to charge the battery.

Figure 3:
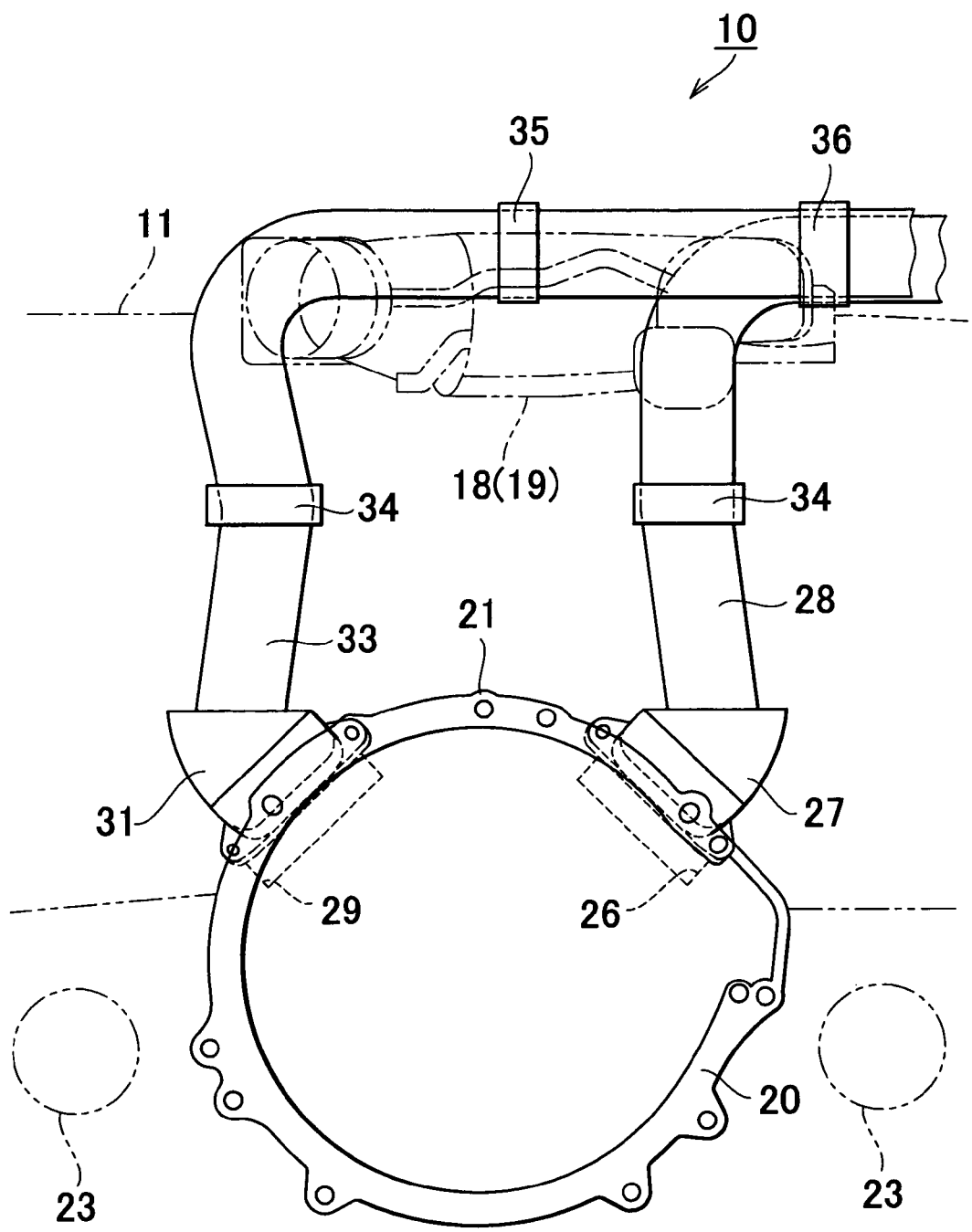
FIG. 3 is a partly front elevational view of a transmission and the routing structure.

As shown in FIGS. 1 and 3, an opening 26 is provided at a point slightly offset toward a lateral side of the vehicle from a top portion (the highest point) 21 in a front portion of the transmission 20. The opening 26 is attached with a wire pull-out portion 27. The bottom portion of the wire pull-out portion 27 positioned within the transmission 20 is provided with connecting terminals (not shown) by the same number as that of stator coils of the motor-generator MG1, and the connecting terminals are connected to the corresponding stator coils. Furthermore, the wire pull-out portion 27 is electrically connected with the plurality of high voltage wires 25. These high voltage wires 25 are placed within a common tube 28 to be gathered in one piece. The tube 28 extends from the wire pull-out portion 27 substantially upward along in the vicinity of the engine 11, and is bent toward a lateral side of the vehicle (the inverter 24 side) in the middle. The bent portion extends in a substantially horizontal direction along in the vicinity of the intake pipe 19. Each of the high voltage wires 25 within the tube 28 is electrically connected with the inverter 24.

Similarly, another opening 29 is provided, in the front portion of the transmission 20, on the opposite side of the opening 26 in a manner so as to sandwich the top portion 21. The opening 29 is attached with a wire pull-out portion 31. The bottom portion of the wire pull-out portion 31 positioned within the transmission 20 is provided with connecting terminals (not shown) by the same number as that of stator coils of the motor-generator MG2, and the connecting terminals are connected to the corresponding stator coils. Furthermore, the wire pull-out portion 31 is electrically connected with the plurality of high voltage wires 32 (refer to FIG. 2). These high voltage wires 32 are placed within a common tube 33 to be gathered in one piece. The tube 33 extends from the wire pull-out portion 31 substantially upward along in the vicinity of the engine 11, and is bent toward a lateral side of the vehicle (the inverter 24 side) in the middle. The bent portion extends in a substantially horizontal direction along in the vicinity of the intake pipe 19. The tube 33 overlaps the tube 28 at a part of the portion thereof that extends in the horizontal direction. Each of the high voltage wires 32 within the tube 33 is electrically connected with the inverter 24.

Meanwhile, both of the high voltage wires 25 and 32 are secured to a securing unit by a securing member at a middle portion of the wires. The securing unit consists of at least one of the engine 11, the engine accessory 18, and the transmission 20. In the present embodiment, the engine 11 and the intake pipe 19 serve as the securing units. The securing member is constructed of clamps 34, 35, and 36 that are attached to the engine 11 and the intake pipe 19 by fastening means such as bolts. The tubes 28 and 33 are secured by the clamps 34 to 36. More specifically, the portions of the tubes 28 and 33 that extend substantially upward from the wire pull-out portions 27 and 31 are secured to a rear face of the engine 11 by the clamp 34, respectively. Furthermore, the portion of the tube 33 that extends in the substantially horizontal direction is secured to a rear face of the intake pipe 19 by two clamps 35 and 36. Moreover, the portion of the tube 28 that extends in the substantially horizontal direction is secured to the rear face of the intake pipe 19 by the clamp 36. That is, the overlapped portion of the tubes 28 and 33 are secured to the intake pipe 19 by the common clamp 36.

It should be noted that the clamps 34 to 36 may employ a known structure such that, for example, the tubes 28 and 33 are elastically secured by a grooved holding portion a part of which is open. In addition, the clamps 34 to 36 may employ a structure that is provided with a pair of holding portions coupled via a hinge so as to be capable of opening and closing, and a securing portion for securing both holding portions in a closed state. In the latter structure, the tubes 28 and 33 are embraced by both holding portions, and also held by securing both holding portions by the securing portion.

Figure 4:
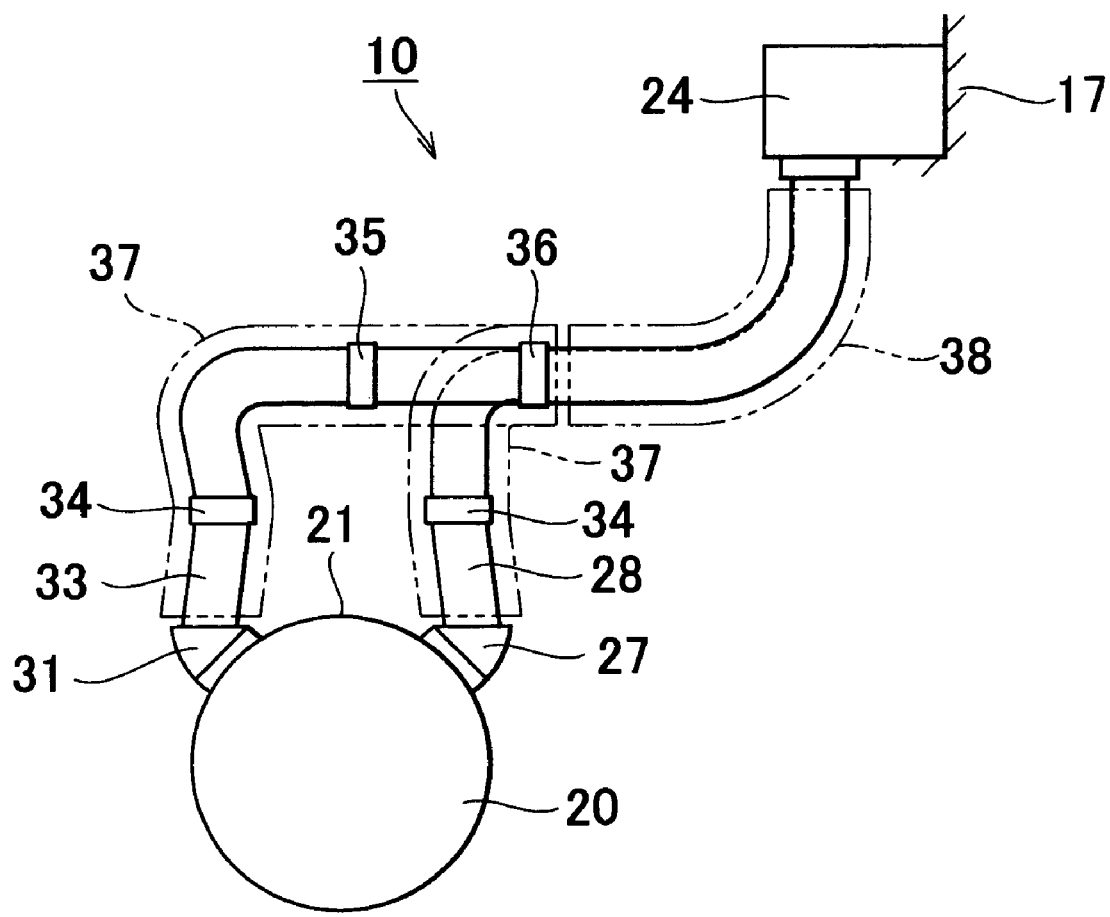

As shown in FIG. 4, the high voltage wires 25 and 32 within the tubes 28 and 33 can be divided into two sections, respectively; namely, a restricted portion 37 which is secured, by the clamps 34 to 36, to the securing unit such as the engine 11 and the intake pipe 19 so that the movement thereof is restricted, and a non-restricted portion 38 which is not secured to the securing unit so that the movement thereof is not restricted. Specifically, with regard to the high voltage wire 25 within the tube 28, generally, a section between the wire pull-out portion 27 and the clamp 36 corresponds to the restricted portion 37, and a section between the clamp 36 and the inverter 24 corresponds to the non restricted portion 38. Furthermore, with regard to the high voltage wire 32 within the tube 33, generally, a section between the wire pull-out portion 31 and the clamp 36 corresponds to the restricted portion 37, and a section between the clamp 36 and the inverter 24 corresponds to the non-restricted portion 38.

It should be noted that relative movement occurs between the inverter 24 and the engine 11, the transmission 20, and the like during operation of the engine 11. Therefore, the high voltage wires 25 and 32 that connect the inverter 24 with the motor-generators MG1 and MG2 are required to absorb such relative movement. In this case, since the movement of the restricted portions 37 of the high voltage wires 25 and 32 is restricted, the aforementioned wire requirement can not be satisfied by these portions. To the contrary, the movement of the non-restricted portion 38 is not restricted, allowing deformation thereof to some extent. Accordingly, a length of the non-restricted portion 38 is set with some allowance so as to absorb the relative movement described above.

According to the present embodiment that employs the structure above, the engine 11 vibrates in an output-shaft rotational direction, a longitudinal direction, a vertical direction, and the like. Also, the transmission 20 itself vibrates by its own operation. Such vibration is transmitted to the engine accessory 18, and also to both high voltage wires 25 and 32 through the wire pull-out portions 27 and 31 attached to the transmission 20.

In this case, securing the high voltage wires 25 and 32 to the vehicle body 17 can be considered as a method to suppress the high voltage wires 25 and 32 from vibrating. For instance, since the high voltage wires 25 and 32 are positioned in front of the dash panel 14, using the dash panel 14 and securing the high voltage wires 25 and 32 thereto can also be considered. However, in this case, vibration of the engine 11 and the transmission 20 is transmitted to the dash panel 14 through the high voltage wires 25 and 32. Such vibration transmission may cause generation of vibration or noise in the dash panel 14.

To the contrary, the high voltage wires 25 and 32 are not secured to the vehicle body 17 in the present embodiment. Therefore, vibration of the engine 11 and the transmission 20 is less likely to be transmitted to the vehicle body 17 through the high voltage wires 25 and 32.

Furthermore, according to the present embodiment, portions of respective high voltage wires 25 and 32 that are closer to the engine 11 side are designed as the restricted portions 37, and are secured to the engine 11 and the intake pipe 19 by the clamps 34 to 36. As a result, the movement of the restricted portions 37 is restricted at the points that are secured to the engine 11 and the intake pipe 19 and surrounding thereof. In cooperation with the increased rigidity of the plurality of the high voltage wires 25 and 32 that are gathered and placed in the common tubes 28 and 33, both restricted portions 37 is less likely to move in relation to the engine 11 and the transmission 20.

Furthermore, if the middle portion of each of the high voltage wires 25 and 32 is not secured at all, the high voltage wires 25 and 32 move in relation to the connecting portion with the motor-generators MG1 and MG2 (the wire pull-out portions 27 and 31) due to vibration of the engine 11 and the like, and a load is thus applied to the wire pull-out portions 27 and 31. Such load may become one of the causes of wire disconnection and the like.

To the contrary, according to the present embodiment, the aforementioned restriction of the wires suppresses movement of both restricted portions 37 in relation to the motor-generators MG1 and MG2. Consequently, a load applied to the connecting portion of the high voltage wires 25 and 32 with the motor-generators MG1 and MG2 (the wire pull-out portions 27 and 31) can be reduced.

Meanwhile, the inverter 24 is fixed to the vehicle body 17 separately from the engine 11 and the like, and thus does not vibrate by itself. Accordingly, the relative movement is caused between the inverter 24 and the motor-generators MG1 and MG2. In this regard, the portions (the non-restricted portions 38) of the high voltage wires 25 and 32 that are closer to the inverter 24 side are not secured to the engine 11 and the like, allowing deformation thereof to some extent. The aforementioned relative movement is absorbed by deformation of the non-restricted portions 38.

Meanwhile, both exhaust pipes 23 through which exhaust gas generated by the operation of the engine 11 flows is subject to heat. In the V-type engine, these exhaust pipes 23 are positioned toward one of the lateral sides of the vehicle from the respective banks 15. To the contrary, the high voltage wires 25 and 32 are routed behind the engine 11 and near and above the transmission 20. Accordingly, since the high voltage wires 25 and 32 are positioned relatively wide apart from the exhaust pipes 23, the high voltage wires 25 and 32 are not susceptible to an influence of heat generated from the exhaust pipes 23. Moreover, the restricted portions 37 of the high voltage wires 25 and 32 are secured to the intake pipe 19 that has the lowest temperature among the securing units (the engine 11, the engine accessory 18, and the transmission 20). Therefore, the influence of heat from the engine 11 and the like caused on the high voltage wires 25 and 32 is less compared to a case in which the high voltage wires 25 and 32 are secured to other securing units.

Furthermore, when impact is applied to the hybrid vehicle 10, devices, parts, and the like arranged in the surrounding of the engine 11 are normally likely to be deformed or displaced than the engine 11. Therefore, for instance, when the impact is applied to the hybrid vehicle 10 from the front, the devices, parts, and the like arranged in front of the engine 11 are deformed or displaced to the rear, thereby reducing a clearance to the engine 11. Similarly, for example, when the impact is applied to the hybrid vehicle from the side, the devices, parts, and the like arranged toward one of the lateral sides of the vehicle from the engine 11 are deformed or displaced, thus reducing the clearance to the engine 11.

Accordingly, if the high voltage wires 25 and 32 are routed in front of the engine 11 with respect to the vehicle longitudinal direction, when the impact is applied to the hybrid vehicle 10 from the front, the high voltage wires 25 and 32 are pinched between the engine 11 and the devices, parts, and the like arranged in front of the high voltage wires 25 and 32. Furthermore, if the high voltage wires 25 and 32 are routed on one the lateral sides from the engine 11, when the impact is applied to the hybrid vehicle 10 from the side, the high voltage wires 25 and 32 are pinched between the engine 11 and the devices, parts, and the like arranged toward the lateral side of the vehicle from the high voltage wires 25 and 32. Such pinching of the high voltage wires 25 and 32 may possibly cause wire breakage or disconnection.

In regard to this point, in the present embodiment in which the high voltage wires 25 and 32 are routed behind the engine 11 with respect to the vehicle longitudinal direction, the engine 11 is not susceptible to deformation or displacement even if impact is applied to the hybrid vehicle 10 from the front. Accordingly, the high voltage wires 25 and 32 are less likely to be pinched between the engine 11 and the devices, parts, and the like arranged behind the high voltage wires 25 and 32. Similarly, the high voltage wires 25 and 32 are less likely to be pinched between the engine 11 and the devices, parts, and the like arranged toward the lateral side of the vehicle from the high voltage wires 25 and 32.

Furthermore, when the impact is applied from the front, the high voltage wires 25 and 32 are protected by the robust engine 11. Even if the engine 11 is displaced to the rear by the impact, such impact is absorbed by a reinforcement and the like and reduced. In addition, the dash panel 14 behind the high voltage wires 25 and 32 has relatively low rigidity. Therefore, when the impact is applied to the dash panel 14 through the engine 11, the dash panel 14 deforms. Consequently, even if the high voltage wires 25 and 32 are pinched between the engine 11 and the dash panel 14, force applied to the high voltage wires 25 and 32 is small.

According to the present embodiment described above, the following effects can be obtained. (1) The high voltage wires 25 and 32 connecting the inverter 24 with the motor-generators MG1 and MG2 are routed behind the engine 11 with respect to the vehicle longitudinal direction. Therefore, even if the impact is applied to the hybrid vehicle 10 from the front or the side, disconnection and breakage of the high voltage wires 25 and 32 can be suppressed.

(2) The engine 11 and the intake pipe 19 serve as the securing units to which the middle portions (the restricted portions 37) of the high voltage wires 25 and 32 are secured. Therefore, unlike a case in which the high voltage wires 25 and 32 are secured to the points that have relatively low rigidity in the vehicle body 17, for instance, the dash panel 14 and the like, vibration of the engine 11 and the transmission 20 is less likely to be transmitted to the dash panel 14 and the like through the high voltage wires 25 and 32, thus suppressing unnecessary vibration and noises.

(3) In the effect (2) above, in order to eliminate an unfavorable condition caused by securing the high voltage wires 25 and 32 to the dash panel 14 and the like (i.e., transmission of vibration from the engine 11 and the like to the dash panel 14 and the like), the high voltage wires 25 and 32 may be secured to a point that is not affected by vibration (that is, a point not susceptible to vibration) such as a reinforcement and a side member. Such arrangement will allow vibration of the vehicle body 17 to be suppressed. However, since these securing members are placed apart from the engine 11, the high voltage wires 25 and 32 need to be long so as to be secured to such members.

In this regard, since the present embodiment enables suppression of transmission of the vibration to the vehicle body 17 as described above, the high voltage wires 25 and 32 need not to be secured to the aforementioned reinforcement and the side member. Accordingly, the aforementioned problem (that a long high voltage wire is required) caused by securing the wires to the reinforcement and the like is less likely to occur.

(4) In addition to the effect (3) above, according to the present embodiment, the inverter 24 is positioned near and above the engine 11, and the connecting points between the motor-generators MG1 and MG2 and the high voltage wires 25 and 32 are set at the upper portion of the transmission 20. The high voltage wires 25 and 32 are arranged behind the engine 11 and near and above the transmission 20. Therefore, the motor-generators MG1 and MG2 can be connected with the inverter 24 by the high voltage wires 25 and 32 by a substantially shortest route. Since the high voltage wires 25 and 32 can be made short, the material cost and the weight can also be reduced.

(5) Each of the high voltage wires 25 and 32 comprises the restricted portion 37 that is secured to the securing unit whereby the movement thereof is restricted, and the non-restricted portion 38 that is not secured to the securing unit so that the movement thereof is not restricted. The high voltage wires 25 and 32 are routed such that the restricted portion 37 is positioned closer to the engine 11 and transmission 20 side, and the non-restricted portion 38 is positioned closer to the inverter 24 side.

As a result, interference between the restricted portion 37 and other parts due to vibration of the restricted portion 37 in relation to the engine 11 and the transmission 20 can be suppressed. Accordingly, a clearance between the high voltage wires 25 and 32 and other parts can be made small, allowing reduction of space for routing the high voltage wires 25 and 32.

Furthermore, the movement of the high voltage wires 25 and 32 in relation to the motor-generators MG1 and MG2 is suppressed, thereby reducing a load applied to the wire pull-out portions 27 and 31. Therefore, when the applied load is large, the wire pull-out portions 27 and 31 must be made robust so as to withstand the load, which may possibly result in a complicated shape or structure of the wire pull-out portions 27 and 31. However, there is no such possibility according to the present embodiment. That is, the shape or structure of the wire pull-out portions 27 and 31 can be simplified, and the size of the wire pull-out portions 27 and 31 can be reduced.

Moreover, the relative movement between the engine 11 and the transmission 20, and the inverter 24 can be absorbed by the non-restricted portion 38. This effect can also be obtained when the inverter 24 is positioned relatively apart from the motor-generators MG1 and MG2. Therefore, the wire pull-out portions 27 and 31 on the motor-generators MG1 and MG2 side can be positioned apart from a wire pull-out portion on the inverter 24 side, and thus, an effect that a degree of freedom in design with regard to mountability is increased can also be obtained.

(6) A plurality of high voltage wires 25 and 32 are connected to respective motor-generators MG1 and MG2, and these high voltage wires 25 and 32 are placed together in the common tubes 28 and 33. As a result, the rigidity of the wires increases compared to a case in which respective high voltage wires 25 and 32 are restricted separately. This is effective in suppressing vibration of the restricted portions 37.

(7) The high voltage wires 25 and 32 are secured to the intake pipe 19 a temperature of which is considered to be the lowest among those of the securing units. Consequently, an influence of heat on the high voltage wires 25 and 32 caused by the engine 11, the transmission 20, and the like can be reduced.

(8) The high voltage wires 25 and 32 routed behind the engine 11 are positioned apart from the exhaust pipes 23 that are disposed toward the lateral sides of the vehicle from the engine 11. In the present embodiment, the high voltage wires 25 and 32 are secured to the intake pipe 19 or the upper rear face of the engine 11 that is apart from the exhaust pipes. Thus, the influence of heat from the exhaust pipe 23 caused on the high voltage wires 25 and 32 can be suppressed.

Particularly, in the present embodiment that employs the V-type engine, the high voltage wires 25 and 32 are positioned near and above the transmission 20 as described above, whereby the high voltage wires 25 and 32 are placed apart from the exhaust pipe 23. This arrangement is effective for suppressing the influence of heat from the exhaust pipes 23.

As a result, a low heat resistant material can be used for the high voltage wires 25 and 32, thereby achieving cost reduction. Moreover, there is no need to take a measure such as providing a heat shield for suppressing the influence of the heat from the exhaust pipes 23.

Figure 5:
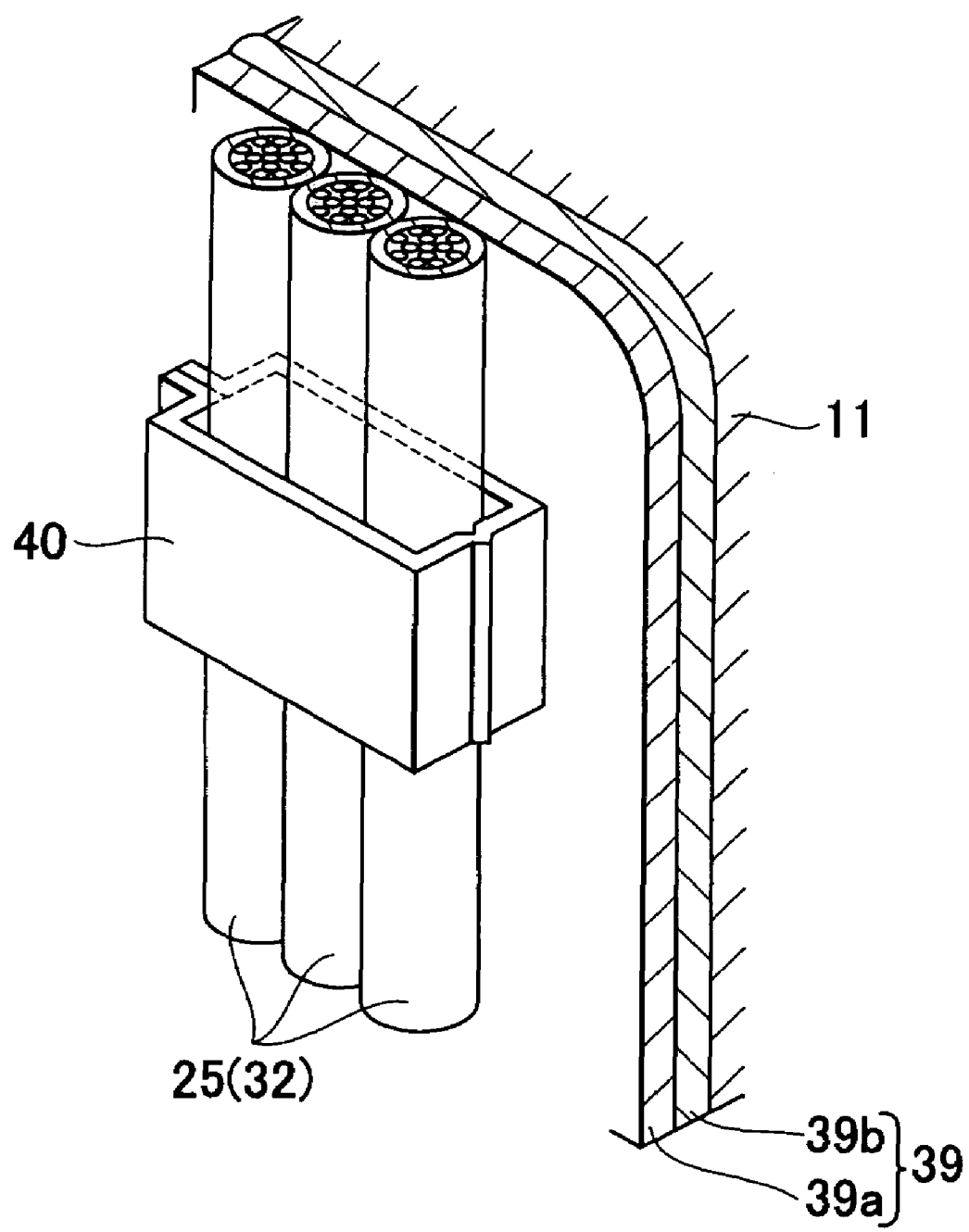
FIG. 5 is a frangmentary perspective view showing another embodiment in which a high voltage wire is secured to an engine using a soundproof cover with clamp.

It should be noted that the invention can be embodied in another embodiment described below. As shown in FIG. 5, if the engine 11 is attached with a soundproof cover 39 as the engine accessory 18, the soundproof cover 39 is integrally provided with a securing member (such as a clamp 40), and the high voltage wires 25, 32 may be secured to the engine 11 through the soundproof cover 39 with the clamp 40. If this structure is employed, the number of parts can be reduced compared to a case in which the soundproof cover 39 and the securing member are provided separately to secure the high voltage wires 25, 32. It should be noted that the soundproof cover 39 is for insulating noise vibration generated from the engine 11, and is composed of, for example, a shielding plate 39a attached to the engine 11, and a sound absorbing material sheet 39b that is attached to the inner side (the engine 11 side) of the shielding plate 39a and is made of glass wool, urethane foam, or the like.

In this case, a plurality of high voltage wires 25, 32 are secured to the soundproof cover 39 in a bundle. Therefore, the rigidity of the wires 25, 32 increases compared to a case in which respective high voltage wires 25, 32 are secured separately. As a result, vibration of the high voltage wires 25, 32 are less likely to be caused, thereby suppressing interference with other parts.

As shown by two-dotted chain line in FIG. 1, when a transmission accessory 41 is fixed to the transmission 20, the transmission accessory 41 serves as one of the securing units, and the middle portions of the high voltage wires 25 and 32 may be secured thereto. In this case, the transmission accessory 41 may be an accessory such as an oil pump and the like.

The securing unit to which the high voltage wires 25 and 32 are secured may simply be at least one of the engine 11, the engine accessory 18, the transmission 20, and the transmission accessory 41. For example, since the structure according to the present embodiment is such that the wire pull-out portions 27 and 31 are attached to the front portion of the transmission 20, both high voltage wires 25 and 32 are secured to the engine 11 and the engine accessory (the intake pipe 19). However, when the wire pull-out portions 27 and 31 are fixed to the rear portion or the middle portion in the longitudinal direction of the transmission 20, it is preferable that the high voltage wires 25 and 32 are also secured to the transmission 20 and the transmission accessory 41.

The invention is applicable to an in-line engine in addition to the V-type engine. The invention can also be applied to a hybrid vehicle that employs a front-engine front-drive (FF) system in which the engine is mounted in the front portion of the vehicle to drive the front wheels. In this case, a transmission is disposed adjacent to the engine toward one of the lateral sides of the vehicle from the engine, however, the high voltage wires are routed behind the engine with respect to the vehicle longitudinal direction in a similar way as described above.

The transmission may incorporate one electric motor (motor-generator) therein. The attaching positions of the wire pull-out portions 27 and 31 with respect to the transmission 20 may be changed to a point that is different from those in the aforementioned embodiments, for example, the top portion 21 of the transmission 20 as shown in FIGS. 3 and 4. Such change of the attaching positions is possible when only one motor-generator mentioned above is used.

The high voltage wires 25 and 32 may also be secured to the vehicle body 17, for instance, the dash panel 14. Furthermore, the invention may also be applied to an other type of a hybrid vehicle in which the inverter is fixed to the engine instead of the vehicle body. Even if such structure is employed, as long as the requirement that the high voltage wires are routed behind the engine with respect to the vehicle longitudinal direction is satisfied, the object of the invention to suppress breakage or disconnection of the high voltage wires due to impact applied can be achieved.

What is claimed is:

1. A hybrid vehicle, comprising:
    an engine which is mounted in an engine room, and serves as a driving source;
    a transmission which is disposed adjacent to the engine, and incorporates at least one electric motor which serves as a driving motor;
    an inverter disposed in the engine room; and
    at least one high voltage wire which is routed between the engine and a passenger cabin of the hybrid vehicle, and connects the inverter and the electric motor incorporated in the transmission;
    wherein a middle portion of the high voltage wire is secured to a securing unit;
    wherein the high voltage wire includes a restricted portion which is secured to the securing unit whereby movement thereof is restricted, and a non-restricted portion which is not secured to the securing unit so that movement thereof is not restricted;

wherein the high voltage wire is routed such that the restricted portion thereof is positioned closer to the engine and transmission side, and the non-restricted portion thereof is positioned closer to the inverter side, the inverter being fixed to a vehicle body; and wherein the transmission is disposed at the back of the engine with respect to a vehicle longitudinal direction, the inverter is disposed near and above the engine, and the electric motor is connected with the high voltage wire at an upper portion of the transmission.

2. The hybrid vehicle according to claim 1, wherein the securing unit comprises at least one of the engine, an engine accessory fixed to the engine, the transmission, and a transmission accessory fixed to the transmission.

3. The hybrid vehicle according to claim 2, wherein the engine accessory is an intake pipe for introducing air to the engine.

4. The hybrid vehicle according to claim 3, wherein the high voltage wire is secured to the engine and the intake pipe.

5. The hybrid vehicle according to claim 1, wherein the high voltage wire is secured to the securing unit at a location that is apart from an exhaust pipe of the engine.

6. The hybrid vehicle according to claim 5, wherein the exhaust pipe is disposed toward one of the lateral sides of the vehicle from the engine.

7. The hybrid vehicle according to claim 6, wherein the engine is a V-type engine that includes a pair of banks in which a plurality of cylinders are arranged in a vehicle longitudinal direction and an exhaust pipe is disposed toward one of the lateral sides of the vehicle from the respective banks, and the high voltage wire is routed near and above the transmission.

8. The hybrid vehicle according to claim 1, wherein a securing member secures the high voltage wire to the securing unit is provided integrally with the securing unit.

9. The hybrid vehicle according to claim 1, wherein the inverter is connected with the electric motor by a plurality of high voltage wires, and respective high voltage wires are secured to the securing unit in a bundle; and wherein the high voltage wires are bundled together and the high voltage wires are secured to the securing unit at the position where the high voltage wires are bundled together.

10. The hybrid vehicle according to claim 1, wherein the inverter is connected with the electric motor by a plurality of high voltage wires, and respective high voltage wires are secured to the securing unit in a bundle.

11. The hybrid vehicle according to claim 1, wherein at least one of the engine, an engine accessory fixed to the engine, the transmission, and a transmission accessory fixed to the transmission acts as the securing unit.

12. The hybrid vehicle according to claim 1, further comprising:

an intake pipe which is positioned above the engine and below the inverter, and introduces air to the engine, wherein the high voltage wire is secured to the engine and the intake pipe.

* * * * *

UNITED STATES PATENT AND TRADEMARK OFFICE
CERTIFICATE OF CORRECTION

PATENT NO. : 7,343,992 B2  
APPLICATION NO. : 10/801554  
DATED : March 18, 2008  
INVENTOR(S) : Kazuaki Shingo et al.

Page 1 of 1

It is certified that error appears in the above-identified patent and that said Letters Patent is hereby corrected as shown below:

| Column | Line | |
|---|---|---|
| 3 | 3 | Change "complicate" to --complicated--. |
| 4 | 32 | After "wires" change "is" to --are--. |
| 4 | 34 | Change "secures" to --securing--. |
| 8 | 30 | After "37" change "is" to --are--. |
| 9 | 5 | After "caused" change "on" to --by--. |
| 9 | 27 | After "on one" insert --of--. |
| 10 | 23 | After "need not" delete "to". |
| 12 | 2 | Change "are" to --is--; change "be caused" to --occur--. |
| 12 | 44 | Change "an other" to --another--. |
| 14 | 4 | Change "secures" to --securing--. |

Signed and Sealed this

Sixteenth Day of June, 2009

JOHN DOLL  
*Acting Director of the United States Patent and Trademark Office*